United States Patent
Sethuramalingam et al.

(10) Patent No.: US 10,754,741 B1
(45) Date of Patent: Aug. 25, 2020

(54) EVENT-DRIVEN REPLICATION FOR MIGRATING COMPUTING RESOURCES

(71) Applicant: Amazon Technologies, Inc., Seattle, WA (US)

(72) Inventors: Ekanth Sethuramalingam, Milpitas, CA (US); Keshav Sethi Attrey, Cupertino, CA (US); Vivek Chawda, Albany, CA (US); Raviprasad Venkatesha Murthy Mummidi, Mountain View, CA (US); Nagaraju Shiramshetti, Santa Clara, CA (US); Sukwon Kim, Palo Alto, CA (US); Swetha Sundar, San Jose, CA (US); Sumeet Talwar, Santa Clara, CA (US); Sophia Yeemei Tsang, Saratoga, CA (US); Sagar Kumar, Mountain View, CA (US); Tianyi Luo, San Carlos, CA (US); Anbuselvan Ramanathan, San Jose, CA (US); Julian Ozen, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 302 days.

(21) Appl. No.: 15/790,988

(22) Filed: Oct. 23, 2017

(51) Int. Cl.
*G06F 11/00* (2006.01)
*G06F 11/20* (2006.01)
*G06F 11/14* (2006.01)
*G06F 9/455* (2018.01)
*G06F 9/48* (2006.01)
*G06F 9/50* (2006.01)

(52) U.S. Cl.
CPC ........ *G06F 11/203* (2013.01); *G06F 9/45558* (2013.01); *G06F 9/4856* (2013.01); *G06F 11/1415* (2013.01); *G06F 9/5077* (2013.01); *G06F 2009/4557* (2013.01)

(58) Field of Classification Search
CPC .. G06F 11/2023; G06F 11/2092; G06F 11/16; G06F 11/20; G06F 11/0709; G06F 11/142; G06F 11/1423; G06F 11/1425; G06F 11/2005; G06F 11/2007; G06F 11/202
USPC ...................................................... 714/4.11
See application file for complete search history.

(56) References Cited

U.S. PATENT DOCUMENTS

| 8,442,955 B2 | 5/2013 | Al Kiswany et al. |
| 9,110,727 B2 | 8/2015 | Brock et al. |
| 9,195,401 B2 | 11/2015 | Li et al. |
| 9,218,197 B2 | 12/2015 | Balani et al. |

(Continued)

*Primary Examiner* — Sarai E Butler
(74) *Attorney, Agent, or Firm* — Robert C. Kowert; Kowert, Hood, Munyon, Rankin & Goetzel, P.C.

(57) ABSTRACT

A migration system or service may implement event-driven replication for migrating a computing resource from a source network to a destination network. A replication event may be detected to obtain a state of a data volume for a computing resource hosted in a client network. A request to a replication agent hosted in the source network may instruct the replication agent to copy at least some of the data of the data volume and send the data to the destination network. The migration service may generate a state of the data volume from the received data in a format that is operable to host the computing resource in the destination network and store the generated state of the data volume.

20 Claims, 13 Drawing Sheets

(56) References Cited

U.S. PATENT DOCUMENTS

| | | | |
|---|---|---|---|
| 9,348,646 B1* | 5/2016 | Daya | G06F 9/4856 |
| 9,361,145 B1* | 6/2016 | Wilson | G06F 9/45558 |
| 2004/0172574 A1* | 9/2004 | Wing | G06F 11/2025 |
| | | | 714/4.12 |
| 2008/0222633 A1* | 9/2008 | Kami | G06F 9/45558 |
| | | | 718/1 |
| 2012/0173653 A1 | 7/2012 | Bland et al. | |
| 2012/0233419 A1* | 9/2012 | Yamashita | G06F 11/1461 |
| | | | 711/162 |
| 2014/0032964 A1* | 1/2014 | Neerincx | H04L 69/40 |
| | | | 714/18 |
| 2014/0165056 A1* | 6/2014 | Ghai | G06F 12/0891 |
| | | | 718/1 |
| 2014/0201151 A1* | 7/2014 | Kumarasamy | G06F 11/1469 |
| | | | 707/646 |
| 2015/0169417 A1* | 6/2015 | Brandwine | G06F 9/45533 |
| | | | 714/4.11 |
| 2015/0254169 A1* | 9/2015 | Gillaspie | G06F 11/3688 |
| | | | 714/38.1 |
| 2016/0077919 A1* | 3/2016 | Duggan | G06F 11/1446 |
| | | | 714/15 |
| 2016/0147557 A1* | 5/2016 | Aasted | G06F 9/45558 |
| | | | 718/1 |
| 2017/0353550 A1* | 12/2017 | Mutalik | H04L 67/1095 |
| 2018/0173554 A1* | 6/2018 | CaraDonna | G06F 9/45558 |
| 2018/0314431 A1* | 11/2018 | Rashid | G06F 12/109 |

* cited by examiner

EVENT-DRIVEN REPLICATION FOR MIGRATING COMPUTING RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource. In order to leverage the scale and capacity of larger collections of computing resources and networks, techniques to migrate computing resources from one network to another may be desirable.

Figure 1:
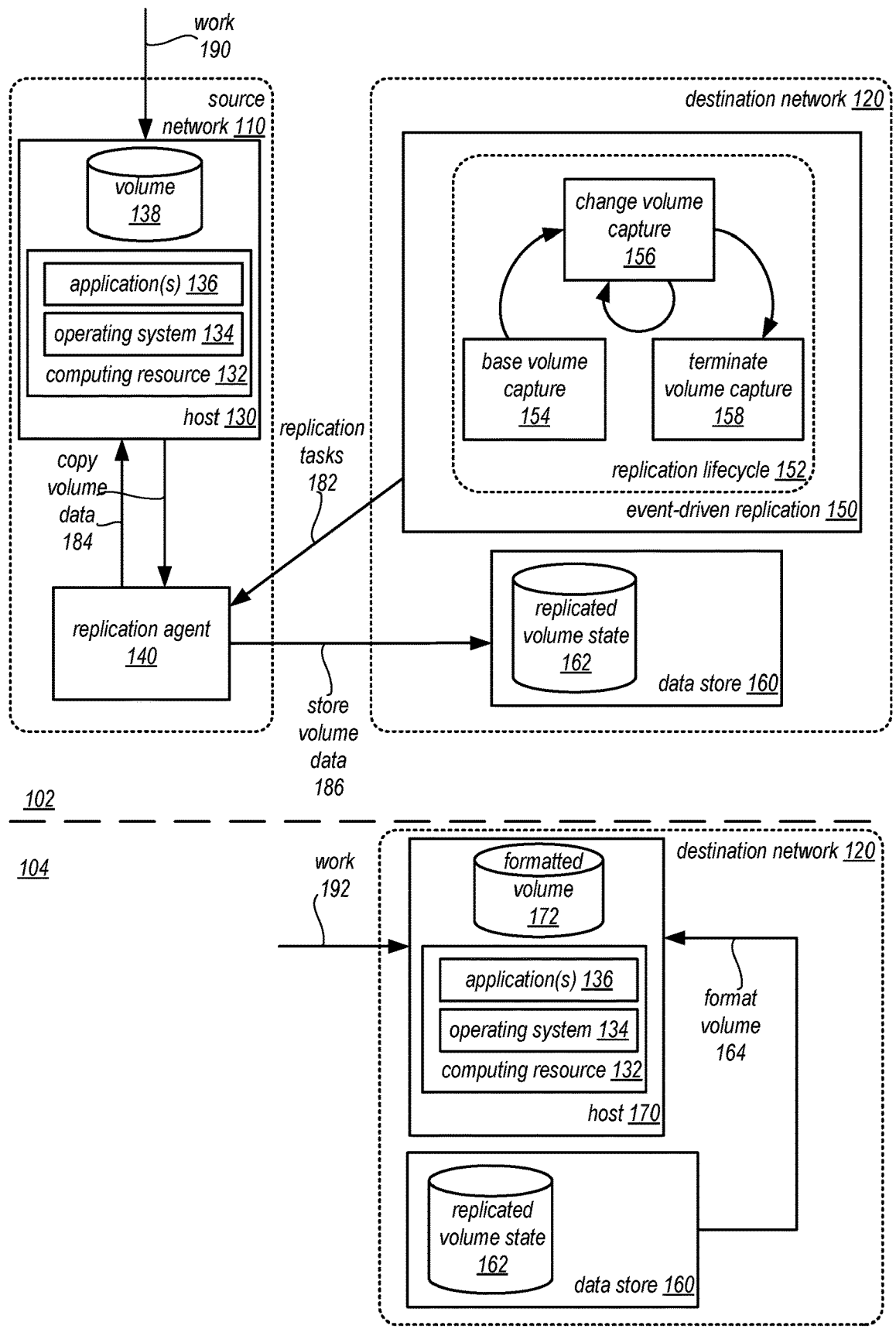
FIG. 1 is a series of logical block diagrams illustrating event-driven replication for migrating computing resources, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may perform event-driven replication for migrating computing resources, according to some embodiments. A provider network may supply clients, operators, or other customers with access to and/or control of one or more computing resources. These resources may include various types of computing systems or devices configured for communication over a network. For example, in some embodiments, a provider network may provide virtual computing resources to clients, users, or other type of customers, in the form of compute instances (e.g., a virtual machine acting as a distinct logical computing system that provides users with the illusion that they are the sole operators and administrators of a given hardware computing resource). Users of a provider network may reserve (i.e., purchase or buy) one or more computing resources (such as virtual machine instances hosted in provider network resources) to perform various functions, services, techniques, and/or applications.

Some users, however, have made significant hardware and software investments in networks of computing resources controlled or managed directly by the entity that utilizes them (e.g., resources hosted in on-premise networks). As the cost and complexity of maintaining such networks rises, these users may desire to migrate computing resources, like virtual machines or other resources performing different tasks, to another network with greater capacity or flexibility, such as a provider network. However, the resources to be migrated are often actively performing work (e.g., servicing requests), and thus may be changing over time as a result of changes to the resource (e.g., operating system configuration changes, added drivers, or other application changes or state information being generated). The down time incurred to stop work, migrate and test a resource at different host in a different network and a different format may be difficult to overcome. Event-driven replication for migrating computing resources may automatically manage capturing changes to data for a resource, combining the changes between different versions of the data, and replicating the data to a desired location in a different network so that when a migration of the resource to the network is performed, the data to implement the resource is already located and formatted for implementation in the different network.

FIG. 1 is a series of logical block diagrams illustrating event-driven replication for migrating computing resources, according to some embodiments. As illustrated in scene 102, source network 110 may implement host system or device (e.g., computing system 2000 in FIG. 12) which may implement a computing resource 132 that utilizes an operating system 134, application(s) 136, and volume 138 of data for resource 132, in some embodiments. For example, computing resource 132 may be a virtual machine or instance that performs tasks or operations using operating system 134, applications 136 and volume 138. Computing resource 132 may be a resource implemented using other virtualization techniques or platforms, like container-based or operating system virtualization, or computing resource 132 may be a non-virtualized resource, such as an operating system 134, applications 136 and volume 134 running on a server as a bare metal environment. Volume 138 may be the set of data for implementing operating system 136 and/or applications 136, in various embodiments. For example, volume 138 may be the logical collection of data for an operating system stored on a persistent storage device (e.g., block-based storage devices, such as a hard disk drive or solid state drive) that stores the various files, data, and configuration information to implement operating system 134. Volume 138 may store the executable file and other resource files or data for implementing applications 136 and may include application data (e.g., database data or state, documents, image or audio files, etc.). In at least some embodiments, data of (or the entirety of) volume 138 may be captured, copied, or stored as disk image file or object. Host 130 may receive work 190 (e.g., from clients) in order to allow computing resource 132 to perform various tasks or operations.

Event-driven replication 150 may be implemented as part of a system or service for destination network 120, to which a user, operator, or entity utilizing host 130 to implement computing resource 132 may desire to migrate computing resource 132 implemented at host 130. The replication lifecycle 152 may define or initiate different replication events for the resource 132, which upon being detected may instruct replication tasks 182 to a replication agent 140 in source network 110 to perform (e.g., to copy volume data 184 (e.g., as an image) from volume 138 and store the volume data 186 to a storage location in data store 160 as part of a replicated volume state 162. Replication lifecycle events may include a base volume capture event 154, which may capture a snapshot (or other point-in-time or consistent state) of volume 138 in its entirety, and copy the entire volume 138 to data store 160 so that computing resource 132 can be launched in destination network 120 at a host, such as host 170, to implement computing resource 132 using the captured base volume state. A change volume capture 156 may reduce the amount of data to be copied 184, capturing changes made to a volume since the volume capture immediately prior to the incremental volume capture (e.g., base volume capture or change volume capture). A change volume can be combined with the immediately prior volume to generate a desired state of volume 138 without transferring all of the data of volume 138 to data store 160. Change volume capture 156 may be repeatedly performed (e.g., according to a schedule) so that changes to volume 138 (and thus computing resource 132) may be incrementally copied to destination network 120. Replication events may continue (e.g., more change volume capture events) until a specified number of change volume captures is reached or other termination state criteria is satisfied (e.g., after 1 week, 1 month, etc.), moving the replication lifecycle to terminate state 158.

Because replication of volume 138 may capture the changes to computing resource 132 over time according to the events of replication lifecycle 152, a migration of computing resource 132 may be performed with little downtime. As illustrated in scene 104, a new host may be provisioned, host 170, to implement computing resource 132. As destination network 120 may utilize different underlying hardware or host platforms (e.g., different virtualization platforms or configurations), the replicated volume state 162 may be converted 164 into a different format 172 and provided to host 170. Work 192 may be quickly redirected to host 170 which can resume operation in the state of the computing resource 132 that was last replicated.

Please note that previous descriptions are not intended to be limiting, but are merely provided as an example of networks, computing resources, volumes, replication agents, replication lifecycles, and so on. For example, volumes may be separately stored and accessed by hosts (e.g., in a block-based storage service as discussed below with regard to FIG. 3).

The specification next includes a general description of a provider network, which may perform event-driven replication for migrating computing resources. Then various examples of a provider network are discussed, including different components/modules, or arrangements of components/module that may be employed as part of implementing a provider network. A number of different methods and techniques to implement event-driven replication for migrating computing resources are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
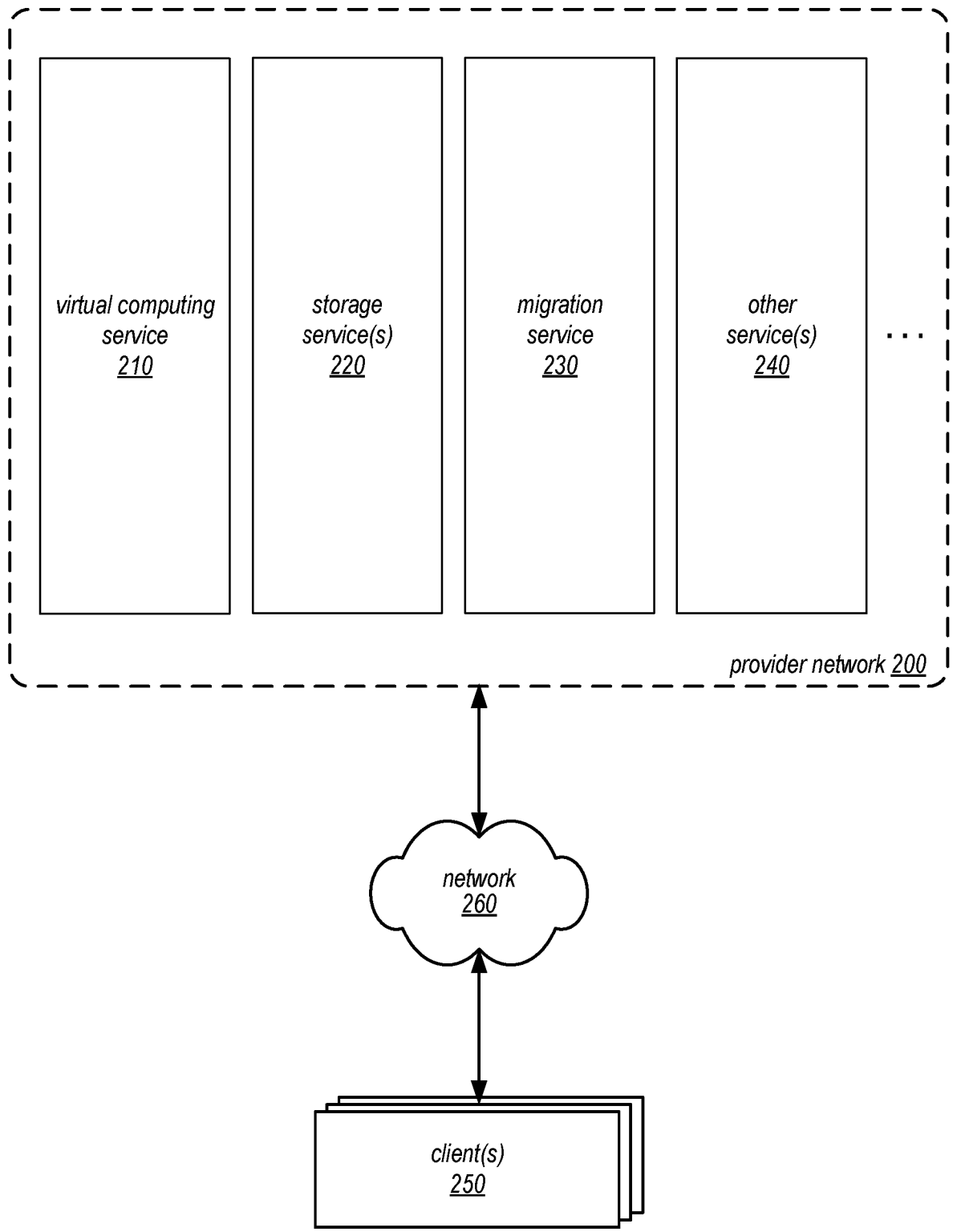
FIG. 2 is a logical block diagram illustrating a provider network that implements different services including a migration service that performs event-driven replication for migrating computing resources, according to some embodiments.

FIG. 2 is a logical block diagram illustrating a provider network that implements different services including a migration service that performs event-driven replication for migrating computing resources, according to some embodiments. A provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous locations to implement provider network 200, which may include one or more data centers hosting various resource pools, such as collections of physical and/or virtualized computer servers, storage devices, networking equipment and the like (e.g., computing system 2000 described below with regard to FIG. 12), needed to implement and distribute the infrastructure and services offered by provider network 200 within provider network 200.

In some embodiments, provider network may implement various computing resources or services, such as a virtual compute service 210, data storage service(s) 220 and 230b, (e.g., database service, an object storage service, block-based storage service, migration service 230, discussed in detail below with regard to FIGS. 3-8, and other service(s) 240 which may be any other type of network based services, including various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual computing service 210 may be implemented by provider network 200, in some embodiments. Virtual computing service 210 may offer virtualized computing resources (e.g., virtual compute instances) and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Virtual compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 250 applications, without for example requiring the client(s) 250 to access an instance. Applications (or other software operated/implemented by a compute instance and may be specified by client(s), such as custom and/or off-the-shelf software.

In some embodiments, virtual compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of virtual compute instances may also include their location, in a particular data center, availability zone, geographic, location, etc. . . . and (in the case of reserved compute instances) reservation term length. Different configurations of virtual compute instances, as discussed below with regard to FIGS. 3-11, may be implemented as computing resources that may host or implement virtual machines or other resources implementing operating systems that store data that is operable to implement the resource including the operating systems in a data volume which may be replicated to provider network 200 and launched on a virtual compute instance hosted by virtual computing service 210.

Data storage service(s) 220 may implement different types of data stores for storing, accessing, and managing data on behalf of clients 250 as a network-based service that enables clients 250 to operate a data storage system in a cloud or network computing environment. For example, data storage service(s) 220 may include various types of database storage services (both relational and non-relational) for storing, querying, and updating data. For example, state information for other services, such as replication job state 440 in FIGS. 4 and 8 may be stored in database service in some embodiments. Queries may be directed to a database in data storage service(s) 220 that is distributed across multiple physical resources, and the database system may be scaled up or down on an as needed basis. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 220 may be implemented as an object-based store, like as object storage service 302 discussed below in FIG. 3, in some embodiments. A storage service 220 like object storage service 302 may provide storage and access to various kinds of object or file data stores for putting, updating, and getting various types, sizes, or collections of data objects or files, such as states of data volumes captured or copied by replication agents for migration service 230, in some embodiments. Such data storage service(s) 230 may be accessed via programmatic interfaces (e.g., APIs) or graphical user interfaces.

Figure 3:
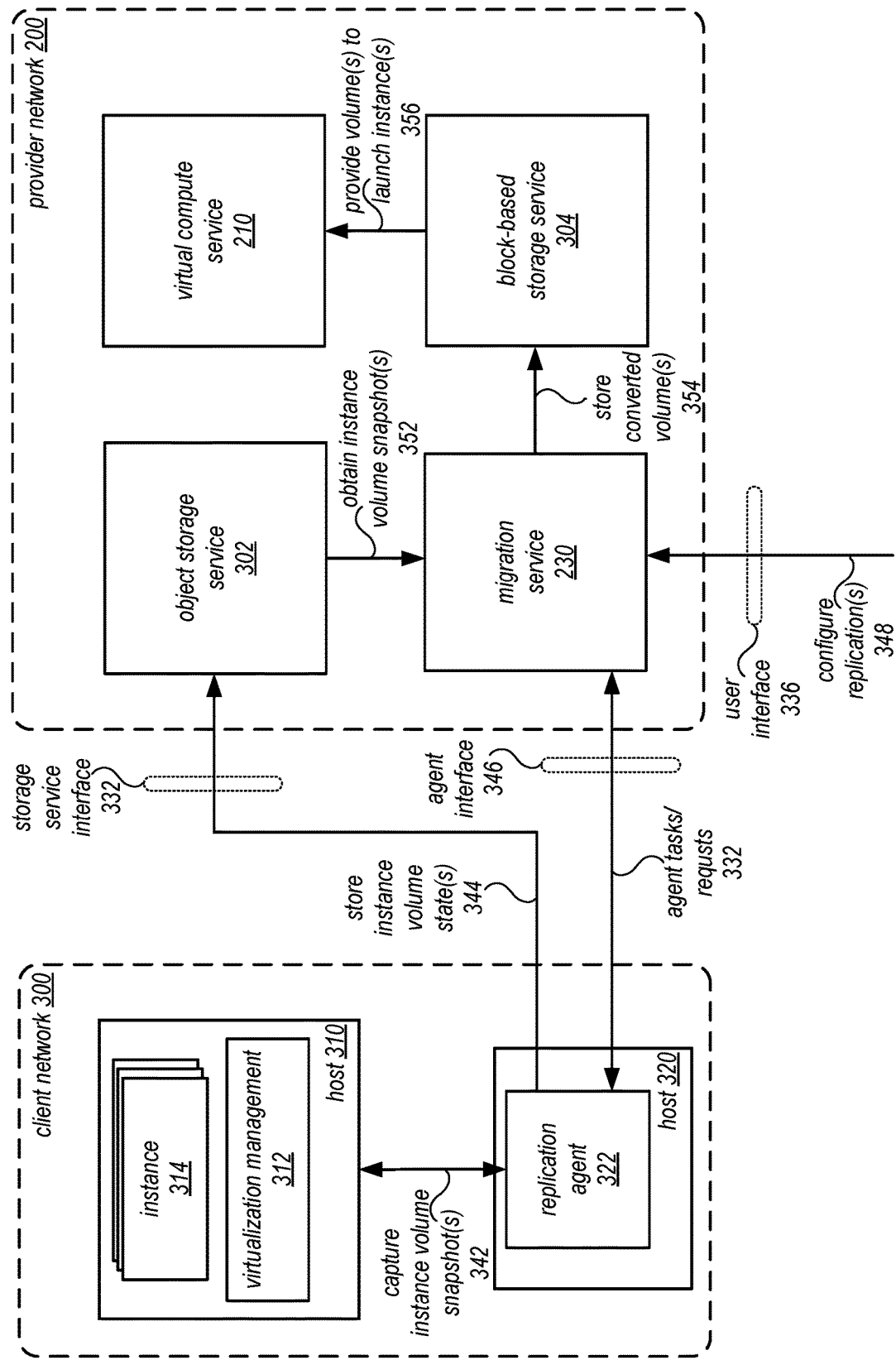
FIG. 3 is a logical block diagram illustrating example interactions between a client network and a provider network that performs event-driven replication for migrating computing resources, according to some embodiments.

Another example data storage service may be a block-based storage service, such as block-based storage service 304 in FIG. 3, for performing storage operations. A block-based storage system may be a storage system that provides block level storage for storing one or more sets of data volumes of data that may be mapped to particular clients (e.g., a virtual compute instance of virtual compute service 210), providing virtual block-based storage (e.g., hard disk storage or other persistent storage) as a contiguous set of logical blocks.

Generally speaking, clients 250 may encompass any type of client configurable to submit network-based requests to provider network 200 via network 260, including requests for storage services (e.g., a request to create a replication job in migration service 230, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 220 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

FIG. 3 is a logical block diagram illustrating example interactions between a client network and a provider network that performs event-driven replication for migrating computing resources, according to some embodiments. Client network 300 may be an on-premise or private network controlled, managed, or otherwise operated by a different entity than provider network 200. Client network 300 may implement one or multiple hosts 310 or other resources, in some embodiments.

A host 310 may be a computing device or system, similar to host 130 discussed above with regard to FIG. 1. Host 310 may implement and/or manage multiple virtual compute instances 314, in some embodiments, and may be one or more computing devices, such as computing system 2000 described below with regard to FIG. 12. Host 310 may include virtualization management 312, capable of instantiating and managing a number of different client-accessible virtual machines or compute instances 314. Virtualization management may include, for example, a hypervisor and an administrative instance of an operating system, which may be termed a "domain-zero" or "dom0" operating system in some implementations. The dom0 operating system may not be accessible by clients on whose behalf the compute instances 314 run, but may instead be responsible for various administrative or control-plane operations of the virtual compute service, including handling the network traffic directed to or from the compute instances 314. Similar to the instances discussed above for virtual compute service 20, instance 314 may a variety of platforms, operating systems, applications, and/or configurations.

Replication agent 322 be downloaded, launched, executed, or otherwise implemented on host 322 (which may be an available or designated hosted in client network 300 selected by a user for client network 300 to operate as a replication agent. Replication agent 322 may act as an agent for migration service 320. Replication agent 322 may be stateless and performs agent tasks such as validating replication settings, capturing volume data 342 (e.g., volume snapshots), uploading or store base or volume states(s) (344 e.g., snapshots) into object storage service 302 via storage service interface 332, consolidating volume states, deleting volume states, and deleting object storage service objects based on agent tasks that migration service 230 creates according to replication job lifecycle, replication task state, and or requests to configure replications 348 submitted via user interface 336. Replication agent 322 may receive or poll for tasks 332 from migration service 230 via agent interface 332. After completing a task, replication agent 322 may provide results to migration service 230 via agent interface 246. Replication agent 322 may, in some embodiments, be provided to client network 300 as a virtual machine that can be downloaded and deployed in client network 300.

Figure 9:
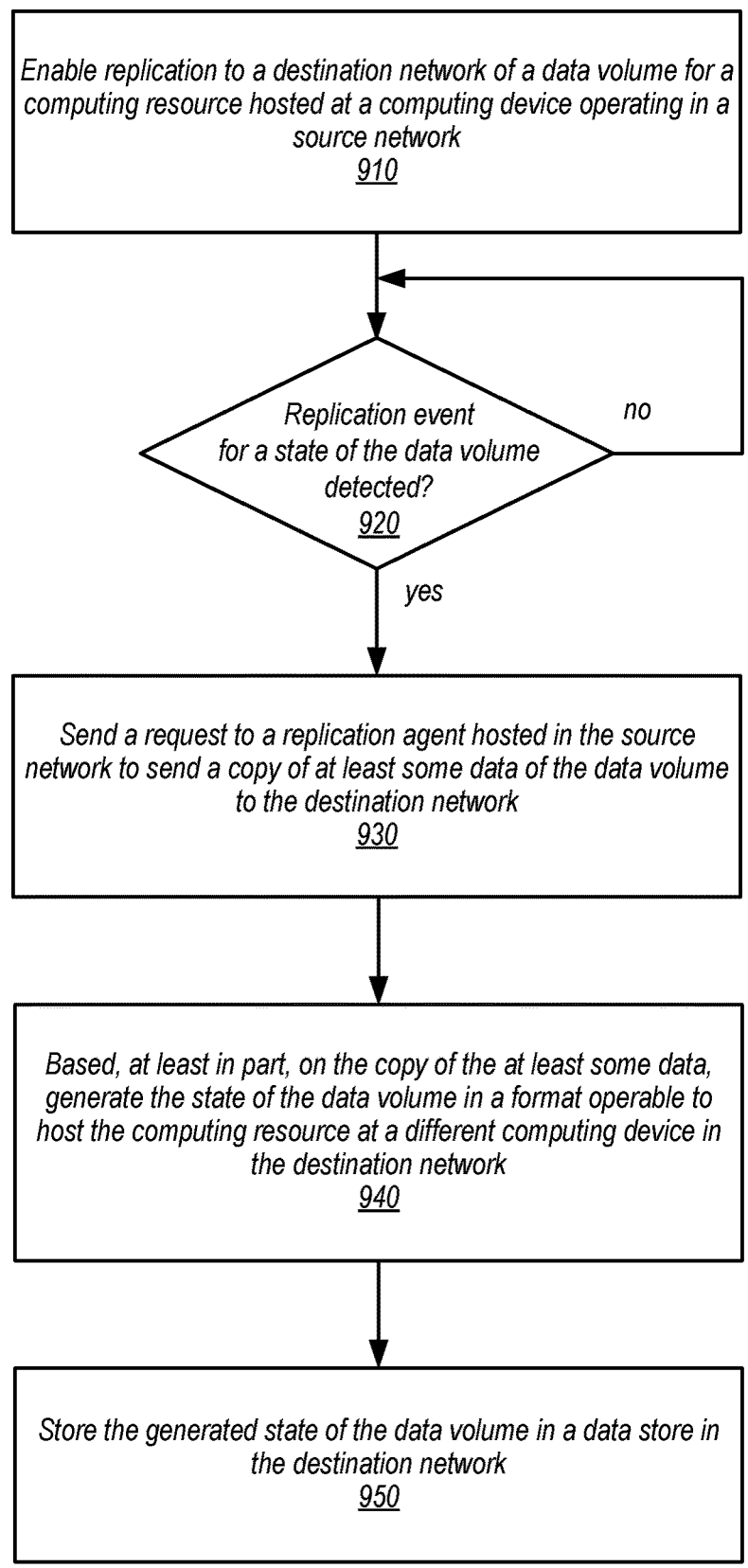
FIG. 9 is a high-level flowchart illustrating techniques and methods to implement event-driven replication for migrating computing resources, according to some embodiments.

Migration service 230 may obtain instance volume state(s) 352 from object storage service, combine, and/or convert them into a different format that is stored in block-based storage service 304, according to various techniques discussed below with regard to FIGS. 9-10. Block-based storage service 304 may be accessed to provide data volume(s) 356 to be launched as compute instances hosted in virtual compute service 210, in some embodiments (e.g., in response to user requests to launch the instance using a replicated data volume.

Figure 4:
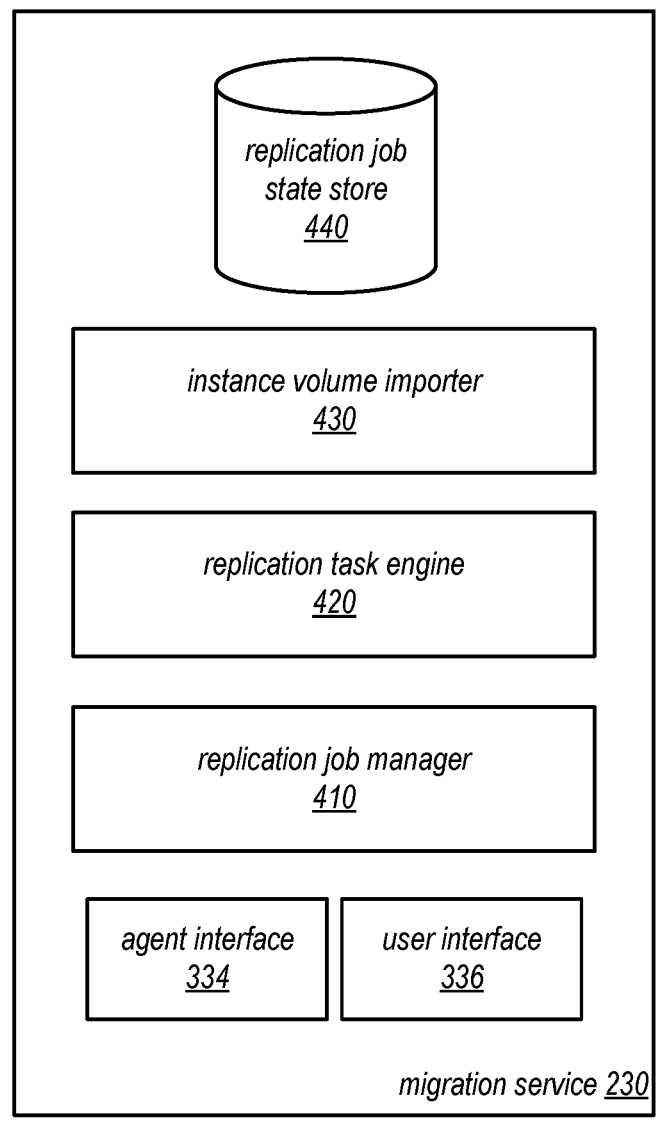
FIG. 4 is a block diagram illustrating a migration service, according to some embodiments.

FIG. 4 is a block diagram illustrating a migration service, according to some embodiments. As discussed above with regard to FIG. 3, migration service 230 may implement various interfaces to interact with users of migration service 230 and replication agents. For example, agent interface 334 may be implemented as a programmatic interface (e.g., using one or more Application Programming Interfaces (APIs)) to interact with replication agents to collect information about client network 300, instances hosted within client network 300, and other information to perform replication jobs, to assign and perform replication tasks, to report replication task status, and other interactions discussed below with regard to FIG. 6. Migration service 230 may implement a management console or other hosted graphical user interface (or command line interface) to perform various actions, such as those discussed below with regard to FIG. 5. In some embodiments, user interface 336 may be implemented as programmatic interface (e.g., using various APIs).

In some embodiments, migration service 230 may implement replication job manager 410. Replication job manager 410 may implement various request handlers to process and dispatch requests received via interfaces 334 and 336 in order to create replication jobs, orchestrate the performance of replication jobs, and clean up and remove replication jobs, in various embodiments. For example, replication job manager may create initial replication job state information and store it in replication job state store 440 in response to a create replication job request. Replication job manager 410 may detect migration events, in various embodiments, as discussed below with regard to FIG. 9. For example, replication job manager 410 may perform various operations to progress a replication job through the various states of a replication job lifecycle and replication task states, as discussed below with regard to FIGS. 7A and 7B. For example, replication job manager 410 may record or log the performance of replication jobs or tasks, assign replication jobs or tasks to replication agents, validate replication job creation requests, and direct cleanup operations, such as deleting old versions or states of a data volume.

In some embodiments, migration service 230 may implement replication task engine 420. Replication task engine 420 may execute a task workflow for base volume replication and a task workflow for a change volume replication, in some embodiments. For example, replication task engine 420 may perform various operations to combine a change volume with a prior version of a data volume, a discussed below with regard to FIG. 10. Replication task engine 420 may interact with instance volume importer 430 to change or convert the format of a data volume to be hosted in virtual compute service 210 in provider network 200. As discussed below with regard to FIG. 10, instance volume importer 430 may be implemented as part of migration service 230 (or in other embodiments not illustrated as a separate service in provider network 200) to perform various operations to modify configuration settings for applications or an operating system in the data volume to satisfy criteria for operation as a virtual compute instance of virtual compute service 210, and/or perform other modifications that may include upgrades, patches, or other changes made to applications or an operating system, which replace portions or all of prior versions of the applications or the operating system. Replication task engine 420 may store (or direct instance volume importer 430 to store the converted version of the data volume to another storage location (e.g., block-based storage service 304). Replication task engine 420 may the update replication job state (e.g., from active to complete), in some embodiments.

Figure 5:
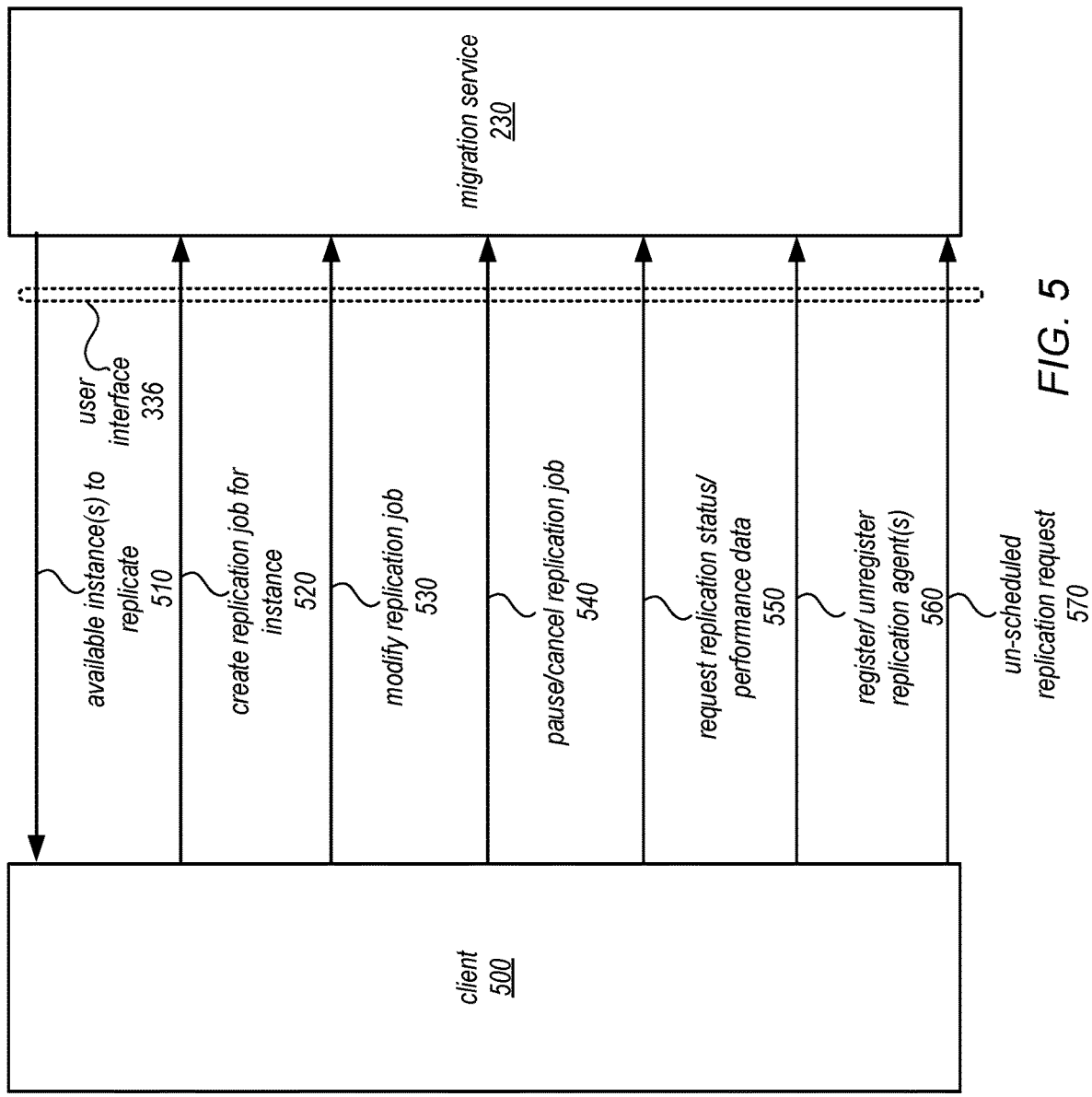
FIG. 5 is a logical block diagram illustrating an example user interface for a migration service, according to some embodiments.

FIG. 5 is a logical block diagram illustrating an example user interface for a migration service, according to some embodiments. Client 500 may be a system or device implemented within a client network or controlled by a user or entity associated with the client network (e.g., similar to client 250 in FIG. 2). Client 500 may obtain available instance(s) to replicate 510 within the client network. For example, as discussed below with regard to FIG. 6, a replication agent may identify those instances for which a replication agent can connect with or access to obtain a data volume for replication. In some embodiments, other user interface 336 requests may be sent to trigger the identification of available instance(s), in response to which migration service 230 may instruct a replication client to identify available instances (e.g., request 630 in FIG. 6).

Migration service 230 may implement (or utilize a separate store or storage service—not illustrated) to store replication job state, including the lifecycle states and task states, discussed below with regard to FIGS. 7A and 7B, and other information such as the various replication job configuration information discussed below with regard to FIG. 5.

Client 500 may send a request to create a replication job for an instance 520 via user interface 336, in some embodiments to migration service 230. For example, creation request 520 may include various information to perform the replication job and direct or configure the replication job, such as schedule or time for performing a base volume replication and change volume replication (e.g., a date/time for performing a base volume replication and indicating that change volume replication may be performed every 12 hours), a limit or maximum number of replications that can be performed for the replication job (e.g., a limit on the number of change volumes capture), access credentials for the client or provider networks systems or services may be obtained, storage locations for volume states in object storage service 302 (or other storage service for uploading volume states) may be in the destination location may be identified, failure or retry modes for the replication job identified, format modifications for converting the state of the data volume, among other information for performing the replication job, in some embodiments.

Client 500 may submit a request 530 to modify or change the various parameters or information discussed above with regard to request 520, in some embodiments. Client 500 may submit a request to pause or cancel a replication job 550 (which may terminate an ongoing replication task or the entire replication job), in some embodiments. Client 500 may submit a request to receive replication job status and/or performance data 560, in some embodiments. For example, the request 560 can identify a replication job, to describe the performance of one or more replication tasks performed (e.g., number and/or type of replication tasks, such as change volume replications performed).

Client 500 may submit a request to register or unregister replication agent(s) 470 for performing replications, in some embodiments, as discussed below with regard to FIG. 7C. For example, the request may include an identifier for the replication agent to unregister from migration service 230 so that migrations service 230 may no longer assign a task to that replication agent (e.g., but may choose another replication agent instead).

Client 500 may submit an un-scheduled replication request 580, in some embodiments. For example, un-scheduled replication request may indicate the type of replication task to perform (e.g., base volume replication or change volume replication), the instance volume to replicate and a time or other triggering event for the unscheduled replication task, in some embodiments.

Figure 6:
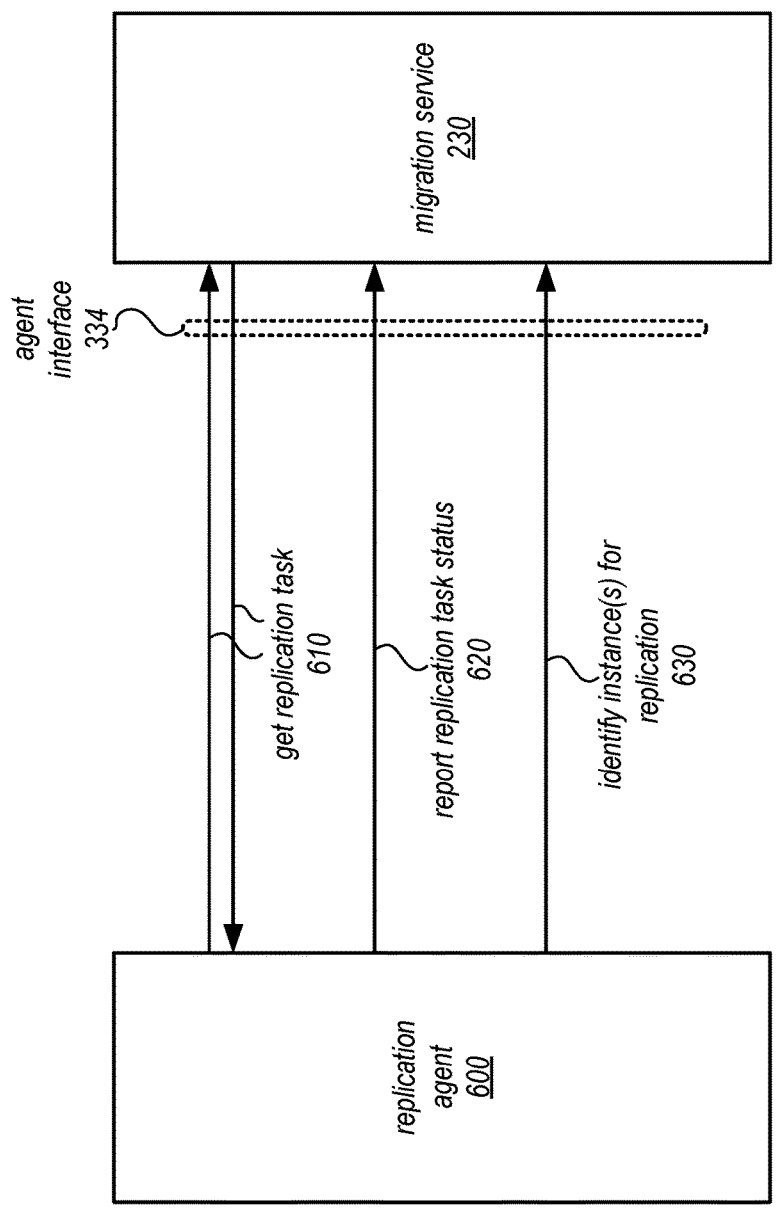
FIG. 6 is a logical block diagram illustrating an example replication agent interface for a migration service, according to some embodiments.

FIG. 6 is a logical block diagram illustrating an example replication agent interface for a migration service, according to some embodiments. Replication agent 600 may be a replication agent similar to replication agent 320 in FIG. 3 that is downloaded and hosted or implemented within a client network. In some embodiments, replication agent 600 may poll or otherwise submit requests 610 to get a replication task. For example, agent interface 334 may implement an API to get the next replication task to perform. In some embodiments, replication agent 600 may replicate volumes for different client network resources and thus the replication task may identify which volume to replicate for which resource. In some embodiments, the replication task request 610 may include parameters such as a task type (e.g., capture a base volume state or change volume state), the location to send the captured data (e.g., which location and/or object store the data in the object storage service 302), the scheduled time or criteria for triggering the event to perform the replication task, among other information for performing the replication task. In some embodiments, replication agents may perform other operations as part of the replication task which may be instructed by migration service 230 (e.g., a task to validate a replication job, a task to create as storage location in object store 302, an operation to combine the data from change volume and base volume, or an operation to delete data (e.g. a state or snapshot of a volume) in the provider network).

Replication agent 600 may report the status of replication tasks 620 via agent interface 334 to migration service 230, in some embodiments (e.g., start, complete, progress, error). Replication agent 600 may identify resources for migration 630, in some embodiments. For example, as discussed above with regard to FIG. 3, multiple different instances, host devices or systems may be implemented as part of a client network. One replication agent 600 may support replication jobs performed for multiple instances at one or multiple hosts. Thus, replication agent 600 may report or identify the instance(s) volumes for which can be replicated to the provider network. For example, the identification message 630 may indicate names, identification numbers, network addresses, file paths, or other information for identifying the resources. Migration service 230 may display or provide a listing of resources via user interface 336, in some embodiments, for which replication jobs may be performed.

Figure 7A:
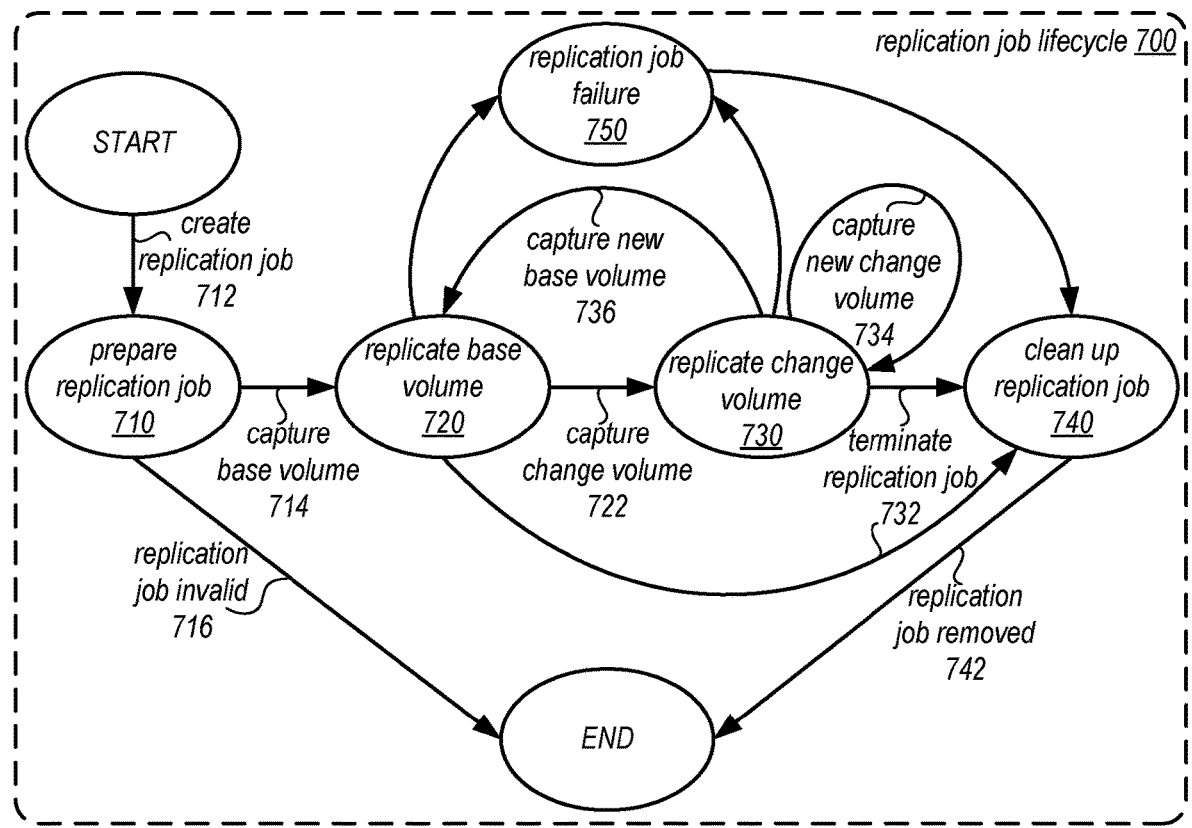
FIGS. 7A-7c are state diagrams for replication jobs, tasks, and agents, according to some embodiments.

FIG. 7A illustrates an example state diagram for a replication lifecycle, according to some embodiments. Replication lifecycle 700 may include prepare replication job state 710, replicate base volume state 720, replicate change volume state 730, and cleanup replication job state 740. Transition to prepare replication job state 710 may be performed in response to a request to create a replication job 712, in some embodiments. Prepare replication job state 710 may include operations to validate the configuration or settings of a replication job, allocate storage or space for storing data volumes (or changes to data volumes), and generate state information for performing the replication job (e.g., updating a state store to include an identifier for a new job, the identity of the resource being replicated, the location of the resource, the configuration parameters for performing the replication job, limitations on performing the replication job, and assignment of replication agents to perform tasks for the replication job, and/or updating the state store to schedule one or multiple replication tasks). An invalid replication job 716 may terminate the replication job.

For valid replication jobs, the state may transition to replicate base volume state 720 upon the detection of the replication event to capture the base volume 714. Operations to perform a base volume replication (e.g., as discussed below with regard to FIGS. 8-11 below) may be performed. If only a base volume replication is scheduled for the replication job, then the replication job may terminate 732 and transition to clean up replication job state 740. If further replication volumes are scheduled, a replication event to capture a change volume 722 may transition state to replication change volume state 730. Multiple change volumes may be captured, as indicated at 734 (e.g., according to a schedule specified for the replication job or triggering events for replicating a new change volume state). In some embodiments, a new base volume may be captured 736, transitioning the state back to replicate base volume state 720. Failures to perform replication at states 720 or 730 may transition to replication job failure state 750, in some embodiments. In some embodiments, a number of retries (or other remedial measures) may be performed prior to transitioning to replication job failure state 750. Once replication clean operations are complete (e.g., removing allocated storage for volumes uploaded from a replication agent), the replication job 742 may be removed from 742 replication job state 440 and the replication job end.

Figure 7B:
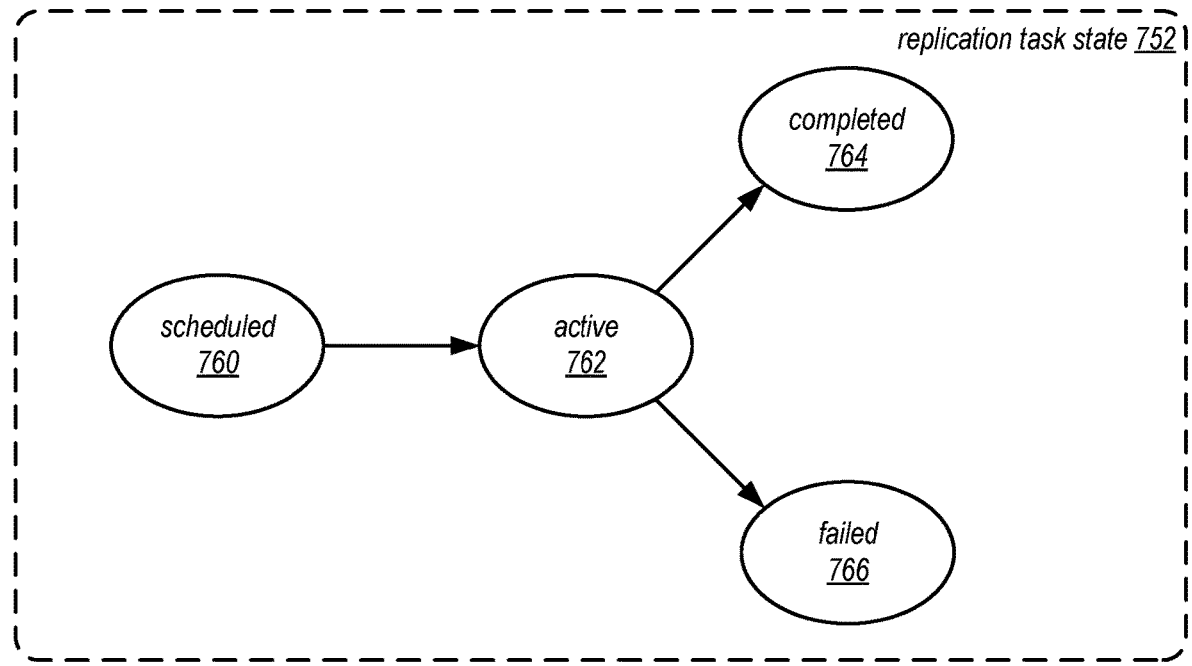

A replication task to replicate a base volume or change volume may also proceed through different states, such as the states illustrated in FIG. 7B that provide an example replication task state 752, in some embodiments. As discussed below with regard to FIG. 8, the state of replication task may be modified by replication job manager 410 management or replication task engine 420, in various embodiments. In the event of a failure of a service component, the state of a replication task may be preserved and continued. When a replication job indicates a number of scheduled replications, then a task may be created in scheduled state when the replication job is created (or when a prior replication task is completed), in some embodiments. For example, when a replication job is created, a first replication task (e.g., a base volume replication task) may be created in replication job state 440 that indicates a scheduled task 760 (which may indicate the criteria for triggering the replication task, such as the time). When the replication task is assigned to a replication agent, the state of the task may be transitioned to active state 762. If the replication task completes successfully, then the task may be transitioned to completed state 764. If the replication task fails (e.g., a failure reported by the replication agent or a failure of the replication agent to report a task status), then the task stated may be transitioned to failed state 766.

Figure 7C:
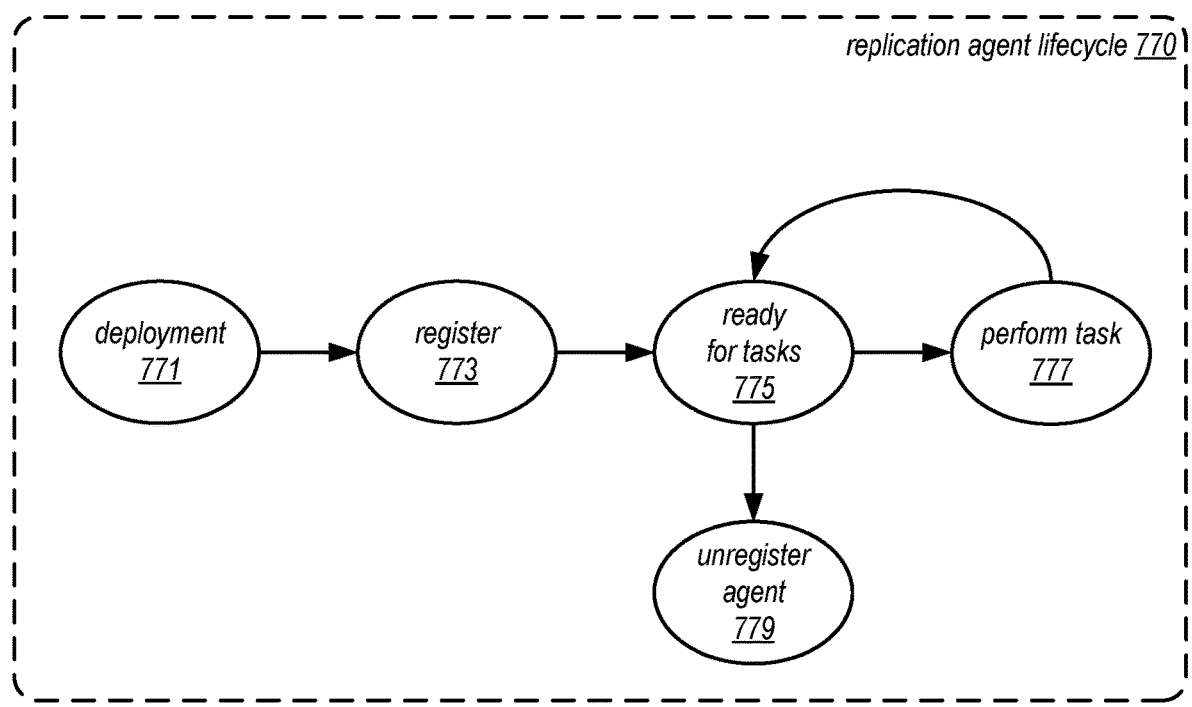

FIG. 7C illustrates an example state diagram for a replication agent, according to some embodiments. In replication agent lifecycle 770, a replication agent may be deployed 771 at a resource in the client network. For example, the code to generate an executable to implement the replication agent or an executable file may be downloaded and/or copied to the selected resource (e.g., at a server with access to desired resources to be replicated over a network connection between the resources and the server). Deployment 771 may include performing configuration or setup operations via graphical or other user interface implemented as part of the replication agent at the resource in the client network that hosts the replication agent. For example, a configuration user interface may allow a user to input various access credentials to create or utilize an account a provider network in order to perform replication tasks.

The replication agent may move to registration state 773 upon completion of deployment operations. In some embodiments, a user may submit a request via the replication user interface to register the replication agent with migration service 230. In some embodiments, the registration operation may be performed automatically upon completion of deployment. Once registered, the replication agent may transition to a ready state 775 for performing tasks. In read state 775, the replication agent may poll for (or listen for) tasks that are assigned to the replication agent. In some embodiments, the replication agent may send health and/or heartbeat/liveness notifications to migration service 230. When a task is obtained, the replication agent may transition to perform task state 777, performing the various operations described or instructed in the task. During the task and/or when the task is complete the replication agent may send task status or updates, as discussed below. When the task is complete, the replication agent may transition back to ready state 775. The replication agent may receive a request from migration service 230 or via user interface for the replication agent to unregister 779 from migration service 230. Once unregistered, the replication agent may no longer poll or listen for tasks, may reject received tasks, and/or may begin performing clean operations to remove the replication agent from the host resource in the client network.

Figure 8:
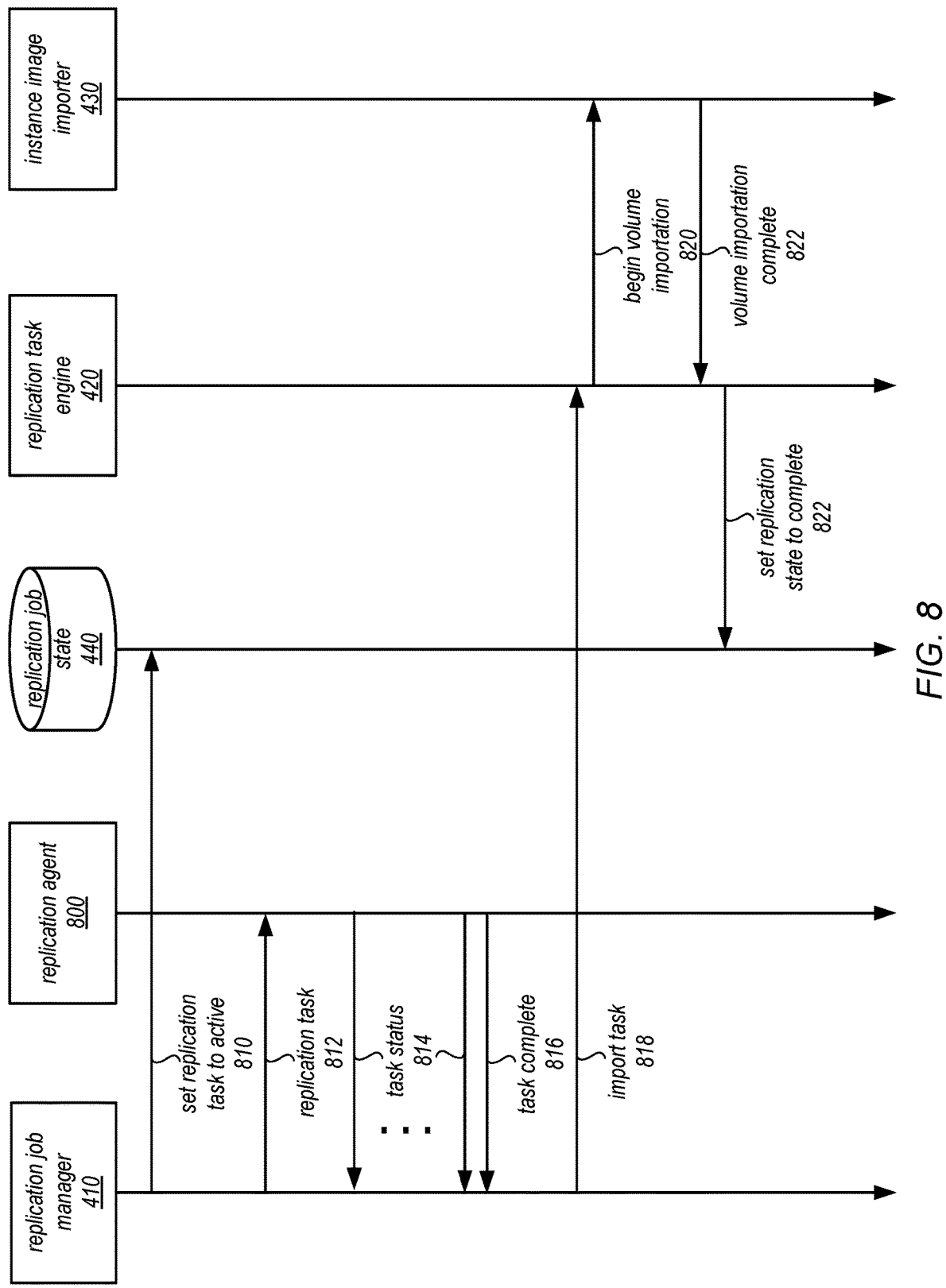
FIG. 8 is a sequence diagram illustrating interactions to replicate a state of a data volume, according to some embodiments.

FIG. 8 is a sequence diagram illustrating interactions to replicate a state of a volume, according to some embodiments. Replication job manager 410 may, in various embodiments, detect a replication event (e.g., a scheduled or unscheduled event to capture a base volume or change volume) for a volume of an instance hosted in a client network, such as illustrated in FIG. 3. Replication job manager 410 may update replication job state 440 to change a replication task state from "scheduled" to "active" as discussed above in FIG. 7B (or may create a new replication task and set to active in the event of an un-scheduled request to perform a replication task). Replication job manager 410 may assign the replication task to a replication agent, such as replication agent 800. Replication agent 800 may poll for replication task 812 or may receive replication task 812 as a push-based request from replication job manager 410.

Replication agent 800 may perform one or multiple accesses to the volume in the client network to obtain the data to copy (e.g., the entire or part of the data volume as discussed below with regard to FIG. 10). Replication agent 800 may report the status 814 of the task to replication task during performance (e.g., a completion indication or other active performance indication). In some embodiments task status 814 may act as a heartbeat or other liveness mechanism to notify replication job manager 410 that the replication task is not yet complete but being performed by replication agent 800. If replication agent 800 fails to report 812, then replication agent 800 may implement a failure workflow or other technique to handle the failed replication task. For example, replication job manager 410 may attempt to retry submitting the task to replication agent 800, identify another replication agent in the client network that can also access the volume and reassign the task, wait before retrying, or sending a failure indication to a client of migration service 230. Replication job manager may 420 may, in the event of a failure, set replication job state 440 for the task to "failed." Replication agent 800 may send an indication of a task completion, in some embodiments, to replication job manager 410 in order to progress forward with the replication of the volume.

Replication job manager 410 may then dispatch an import task 818 to replication task engine 420 which may initiate a workflow to combine the data with prior versions (if the replication task is for a change volume), as discussed below with regard to FIG. 10, and interface with instance volume importer 430 to begin 820 import of the volume as a different instance image format. Instance volume importer 430 may send an indication that the volume importation is complete 822 to replication job engine 420 which may set the replication state for the task to complete 822.

The examples of event-driven replication for migrating computing resources discussed above with regard to FIGS. 2-9 have been given in regard to replicating volumes for virtual computing resources that can be migrated to and hosted by a provider network. Various other types or configurations of a provider network, migration service, or computing resource, including bare metal hosts for computing resources, may implement these techniques. Event replication may, in some embodiments be performed for multiple computing resources in an on-premise network as part of preparing for a larger migration of many different computing resources to a provider network. FIG. 9 is a high-level flowchart illustrating techniques and methods to implement event-driven replication for migrating computing resources, according to some embodiments. These techniques, as well as the techniques of FIGS. 10-11 described below, may be implemented using various components of a provider network as described above with regard to FIGS. 2-8 or other types or systems implementing a provider network.

As indicated at 910, replication to a destination network of a data volume for a computing resource (e.g., an operating system and one or more applications, which may be hosted in a virtual machine, container, or implemented on a bare metal host) hosted at a computing device operating in a source network may be enabled, in some embodiments. For example, a replication agent may be downloaded, sent, launched, deployed, or otherwise implemented within the source network that is capable of communicating with the destination network (e.g., via agent interface 334 in FIGS. 4 and 6). In some embodiments, the replication may be enabled in response to a request to create a replication job, such as discussed above with regard to FIG. 5. Enabling replication may, in some embodiments, define replication events (e.g., according to state changes in the volume, scheduled events, or other events that may trigger replication of a volume state automatically). Access credentials for source or destination networks may be obtained, storage locations for volume states may be in the destination location may be identified, failure or retry modes for the replication job identified, format modifications for converting the state of the volume, among other information for performing the replication job may be obtained or determined as part of enabling replication.

As indicated by the positive exit from 920, a replication event for a state of the data volume may be detected, in various embodiments. Replication events may be detected according to different criteria. For example, in some embodiments, replication events may be detected in response to time-based events, such as a schedule for performing replications (e.g., every Tuesday at 12:00 am) or time elapsed since last replication event (e.g., 48 hours since last replication event) which may be indicated by an evaluation of replication state. Replication events may, in some embodiments, be triggered in response to a user request to perform replication (e.g., an un-scheduled request 560 in FIG. 5 in addition to scheduled replication events). Replication events may, in some embodiments, be triggered by information or indications of changes to volume state. For example, replication agent may monitor a system log or other data describing changes to a volume to detect change events and send a notification to a migration system or service to determine whether a replication event should be triggered in response. Replication events may be triggered by detecting a transition from one replication lifecycle state to another (e.g., from a base volume replication state to a replicate change volume state, from one replicate change volume state to another, as illustrated in FIG. 7A). Multiple criteria may be applied, in some embodiments alone or in combination. For instance, a maximum number of replication tasks performed by a single replication agent may throttle or otherwise delay the triggering of a replication event if the replication agent is unavailable or unable to perform a replication task that would cause the replication agent to exceed the maximum number.

As indicated at 930, a request may be sent to a replication agent hosted in the source network to send a copy of at least some of the data of the data volume to the destination network, in various embodiments. For instance, the type of replication event may be indicated in the request, which, as discussed below with regard to FIG. 10, may determine whether an entire copy of the data of the volume may be requested or if only changes since a last replication of the volume are requested, in some embodiments. The data may be received or stored in an intermediate storage, such as another data store or service implemented as part of a provider network prior to generating the state of the volume in the different format.

As indicated at 940, a state of the data volume in a format operable to host the computing resource at a different computing device in the destination network may be generated based, at least in part, on the copy of the at least some data received from the replication agent. For example, the data of the data volume may include additional files, directories, objects, data blocks, or other information to include or apply to a prior state or version of the volume (as discussed below with regard to FIG. 10). The different format may include different a different image format, arrangement, organization or structuring of the data volume (e.g., from one file system to another), in some embodiments. The generated version state of the volume may include further modifications (e.g., new drivers, different applications or operating system upgrades, security upgrades, or configuration changes), in some embodiments.

As indicated at 950, the generated state of the data volume may be stored in a data store in the destination network. For example, as discussed above with regard to FIG. 3, the state of the volume may be stored in a block-based storage service which can be accessed or used to launch the computing resource in a different location, such as virtual compute instances that implement the operating system at the different computing device in the destination network. In other embodiments, the data may be stored at particular server, host, system, or device that will access the state of the volume via a local interconnect or other connection (e.g. attached storage device(s) accessed via PCIe). The generated state of the volume may be identified or placed in a location indicated in the replication job or other information determined when replication is enabled, as discussed above at 910, in some embodiments.

Figure 10:
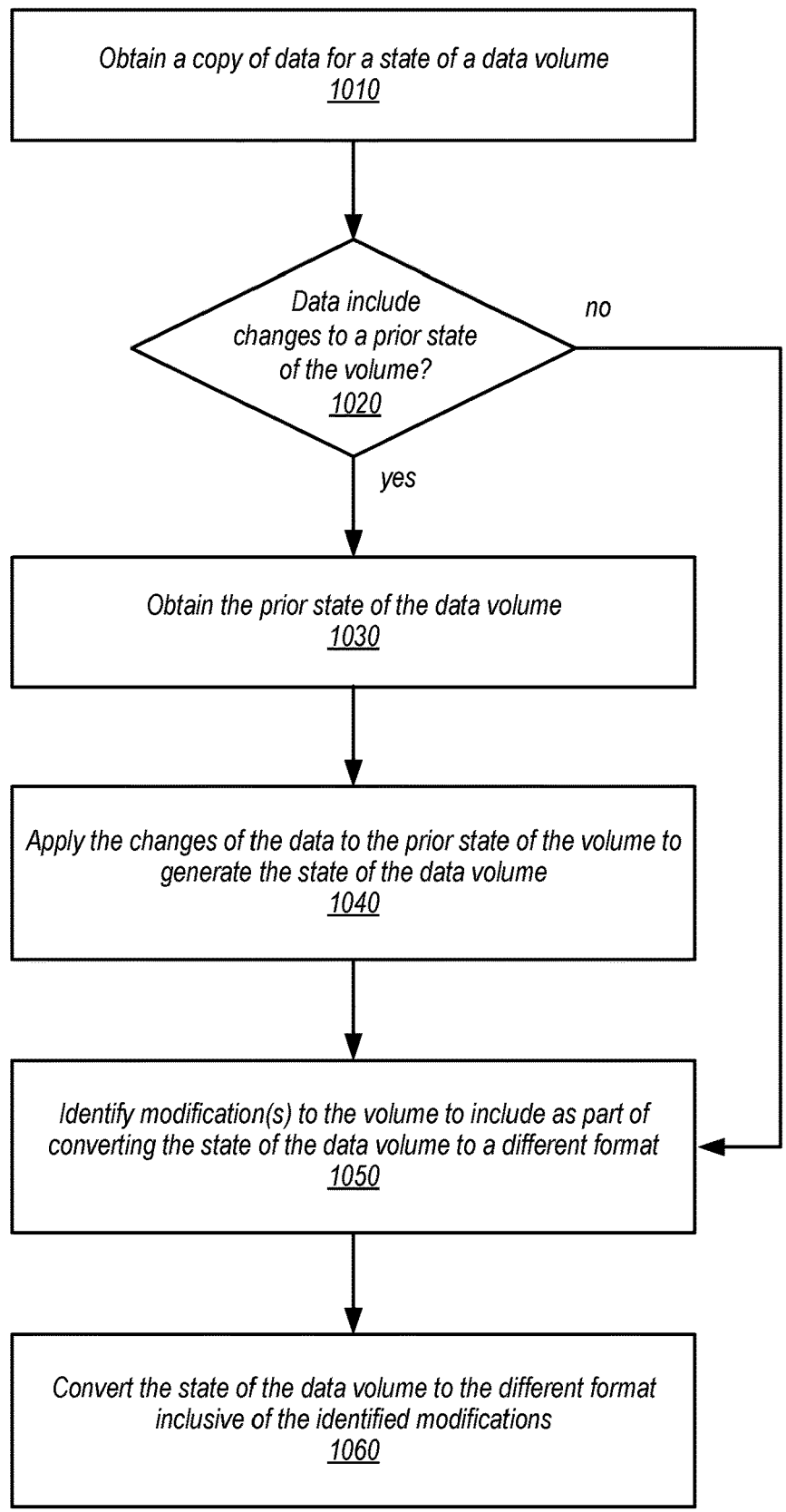
FIG. 10 is a high-level flowchart illustrating techniques and methods to implement generating a state of a data volume, according to some embodiments.

FIG. 10 is a high-level flowchart illustrating techniques and methods to implement generating a state of a volume, according to some embodiments. As indicated at 1010, a copy of data for a state of a data volume may be obtained, in some embodiments. For example, a data store (e.g., such as a storage service, host, or subsystem) of a destination network may store data copied from a data volume at a source network received from a replication agent, in some embodiments. The copy of data may be accessed or read from the data store. In some embodiments, the copy of data may be obtained directly from the replication agent without intermediate storage in a data store, in some embodiments.

As indicated at 1020, the data may indicate or include changes to a prior state of the volume, in some embodiments. If, for example, the replication task that caused the data of the volume to be obtained were a replication task to obtain incremental or changes to volume which had been previously replicated, then the data may include (e.g., and in some embodiments may only include) the changes to the prior state. The replication lifecycle or other replication state information for the volume maybe evaluated, in some embodiments, to determine whether or not the data includes changes to a prior state of the volume. If changes are included, as indicated by the positive exit from 1020, then the prior state of the volume may also be obtained, as indicated at 1030, in some embodiments. For example, the data store in the destination network may store a copy of the prior volume, in some embodiments.

As indicated at 1040, the changes of the data may be applied to the prior state of the volume to generate the state of the volume, in some embodiments. For example, different files, directories or other logical data objects (or the data within the logical data objects) may be replaced, or physical data locations (e.g., pages, blocks, sectors, extents, etc.) may be replaced with the obtained data for the state. In some embodiments, the changes may include the deletion of data or the addition of data.

As indicated at 1050, in some embodiments, modification(s) to the volume to include as part of converting the state of the volume to a different format may be identified. The different format may be a format for hosting an operating system (and other applications or resources in the volume) in the destination network (e.g., at a different virtualization host or server). For example, different configuration settings for applications or an operating system in the volume may be identified for a new host environment (e.g., a different type of virtualization platform, host hardware, etc.). Consider system loggings for an operating system. The configuration setting for the system logging setting may be modified to direct log events to a different storage location, system or service (e.g., an event logging or metrics collections service implemented as part of a provider network instead of a local storage device). In some embodiments, the modifications may include upgrades, patches, or other changes made to applications or an operating system, which replace portions or all of prior versions of the applications or the operating system. Additional applications to add may be identified, in some embodiments. In at least some embodiments, a replication job request may allow a user to specify the types of modifications performed, which may limit or exclude some modifications (e.g., upgrades) while allowing other modifications (e.g., security patches).

As indicated at 1060, the state of the volume may be converted to the different format inclusive of the identified modifications. For example, the different format may include information for accessing, executing, operating, launching or otherwise utilizing the volume in the destination network to implement a computing resource, such as virtual machine. The volume may, for instance, be converted into a different image file or format that is readable by host systems in the destination network, permissions, account identifiers, mapping information, and/or other data for implementing the computing resource.

Figure 11:
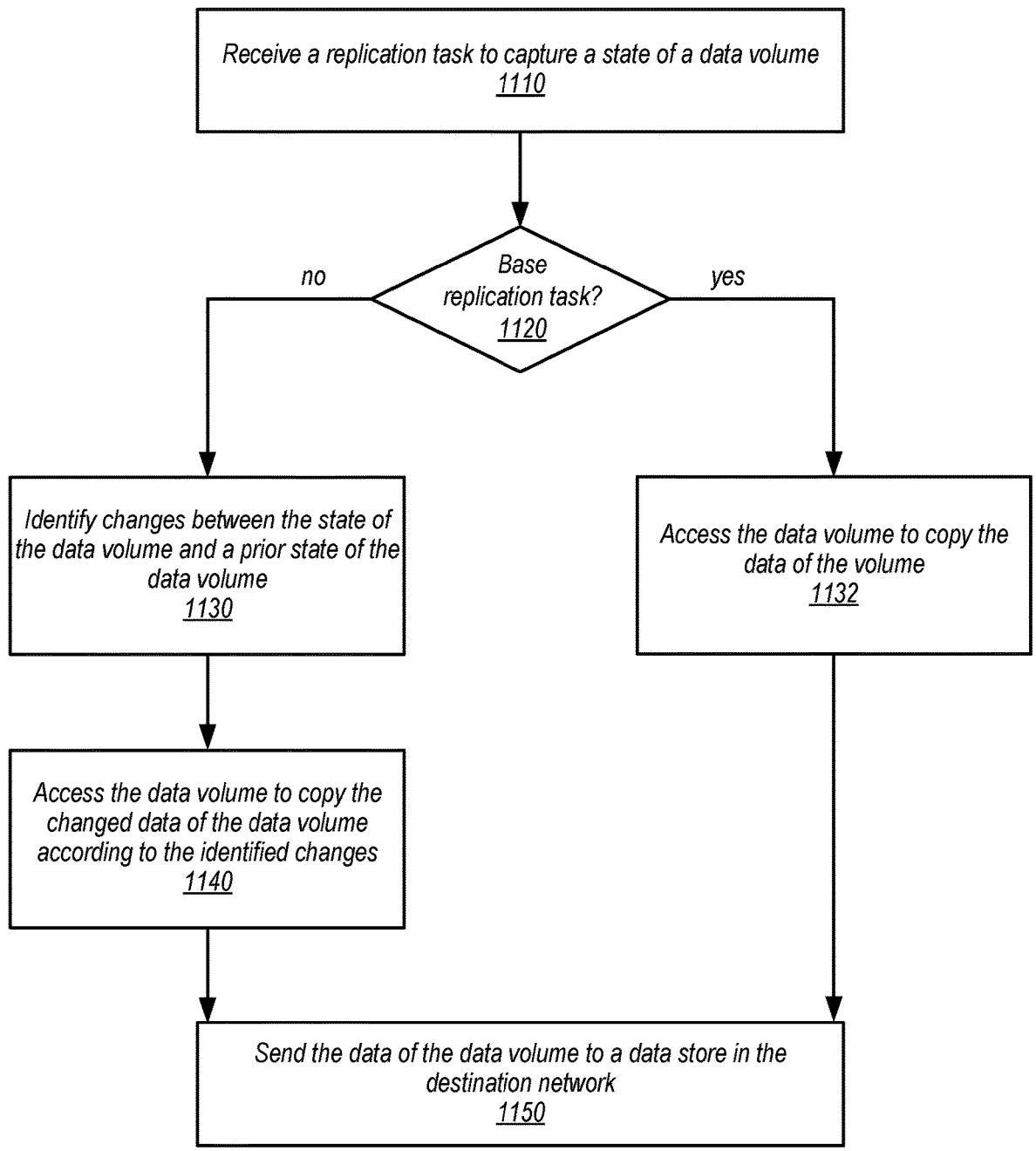
FIG. 11 is a high-level flowchart illustrating techniques and methods to implement performing replication tasks, according to some embodiments.

On-premise or locally hosted replication agents may perform a replication task to obtain data to generate or create a state of a volume, in some embodiments. FIG. 11 is a high-level flowchart illustrating techniques and methods to implement performing replication tasks, according to some embodiments. As indicated at 1110, a replication task to capture a state of a volume may be received, in various embodiments. As discussed above with regard to FIG. 6, the replication task may be received via a programmatic interface (API) or other triggering event at a replication agent hosted in a source network (e.g., client network) different from the destination network (e.g., the provider network to which the replicated state of a volume is to be stored). The replication task may identify the computing resource, a virtual machine, container, server, or other computing resources, hosted on a computing device in the client network by including an identifier, network address, file path, or other location for the volume to capture. In some embodiments, the replication task may indicate a time or other particular state of the volume to capture (e.g., after the most recent upgrade to the computing resource).

As indicated at 1120, the type of replication task may be indicated in some embodiments. For replication tasks that are a base replication, as indicated by the positive exit from 1120, the volume may be accessed to copy the data of the volume, as indicated at 1132, in some embodiments. For example, a file transfer protocol, physical block copy mechanism, or other data transfer technique may be implemented to obtain the entire data of the volume at the state indicated in the replication task. As indicated at 1150, the obtained data of the volume may be sent to the destination network. For example, the replication task may indicate a storage location (e.g., a network endpoint, file path, server name or host, storage device or storage object, etc.) to send the data of the volume. In some embodiments, an identifier, name, and/or other information describing the data (e.g., a timestamp of when the data was copied) may be included along with the data.

As indicated by the negative exit from 1120, if the replication task is not a base replication task, then the changes between the state of the volume and a prior state of the volume may be identified, in some embodiments, as indicated at 1130. For example, a system log file or other description of changes to the volume may be scanned, accessed, or otherwise evaluated to identify the changes made to the volume since the prior state. In some embodiments, the prior state may be indicated (e.g., by a timestamp or other descriptor) in the replication task. As indicated at 1140, the volume may be accessed to copy the changed data of the volume according to the identified changes, in some embodiments. For example, data blocks, pages, sectors, directories, files, objects or other groupings or locations of logical or physical data may be identified in order to determine which portions of the data volume to copy. The identified portions may be read and combined into a single set of data changes along with corresponding mappings to the locations within the volume to which they belong, in some embodiments (e.g., replacement data blocks 12,110 to 13,109). As noted above, the copied data may be sent to the data store in the destination network, as indicated at 1150, in some embodiments.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 12:
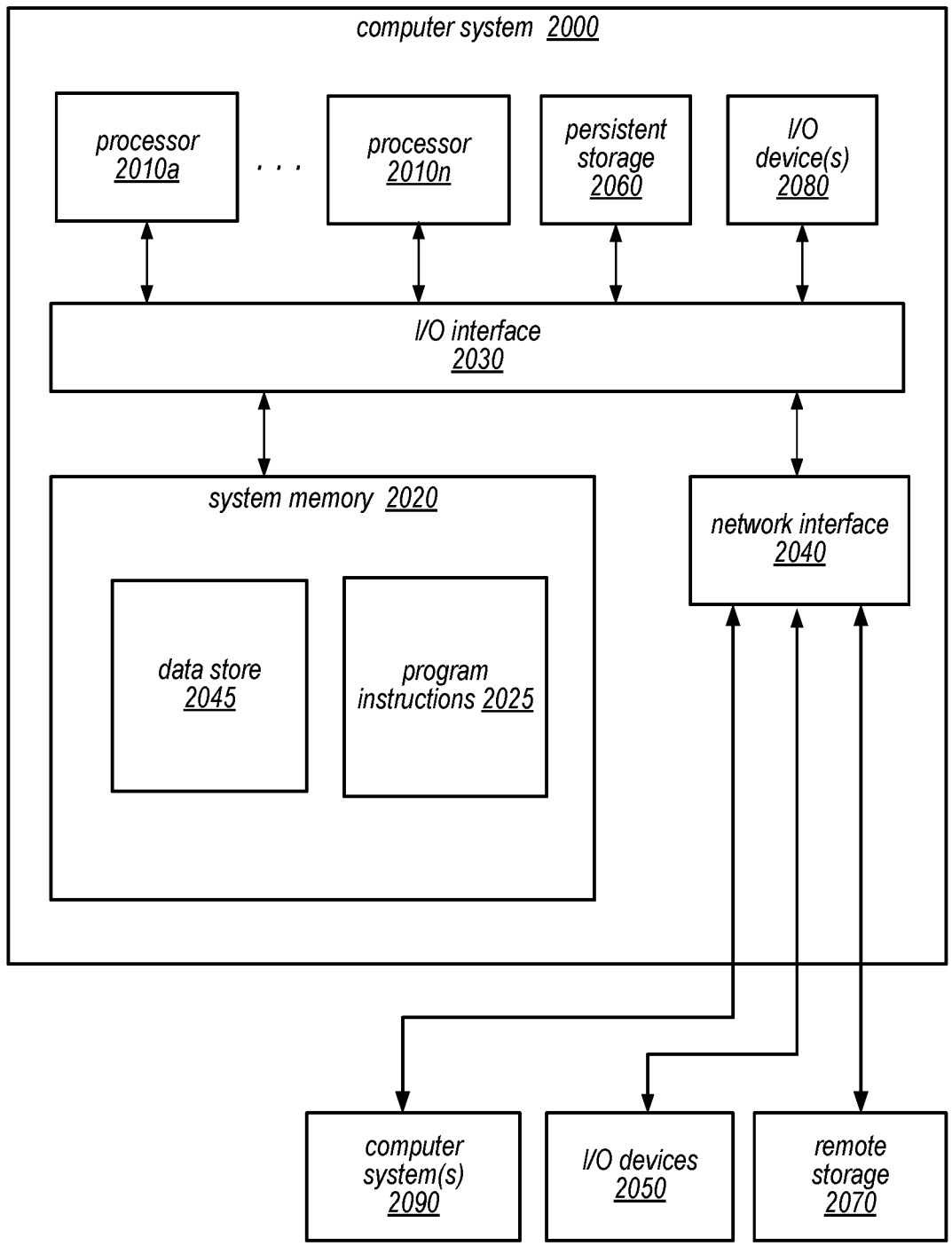
FIG. 12 is a block diagram illustrating an example computing system, according to some embodiments.

Performing event-driven replication for migrating computing resources as described herein may be executed on one or more computer systems, which may interact with various other devices. FIG. 12 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the provider network described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a provider network, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing nodes, respectively comprising at least one processor and a memory, that implement a migration service in a provider network;
the migration service of the provider network, including instructions that upon execution cause the migration service of the provider network to:
evaluate a replication state for a virtual machine hosted at a computing device operating in a separate client network separate from the provider network to detect a replication event to replicate a state of a data volume for the virtual machine hosted at the computing device operating in the separate client network;
after the detection of the replication event:
send a replication task to a replication agent hosted in the separate client network to send, to the provider network, a copy of at least some data of the data volume for the virtual machine hosted at the computing device operating in the separate client network;
obtain the copy of the at some data of the data volume for the virtual machine;
convert the state of the data volume from a first format to a second format based at least in part on the obtained copy of the at least some data of the data volume for the virtual machine, wherein the second format is usable to instantiate the virtual machine in the provider network; and
store the converted state of the data volume for the virtual machine in a data store in the provider network.

2. The system of claim 1, wherein the migration service comprises a user interface and wherein the instructions further cause the migration service to:
receive, via the user interface, a request to create a replication job to replicate the data volume for the virtual machine; and
generate the replication state for the virtual machine to schedule the replication task.

3. The system of claim 1, wherein the replication event comprises an event to capture changes to changed portions of the data volume that occurred after a prior state of the data volume, wherein a type of the replication task sent to the replication agent instructs the replication agent to copy the changed portions of the data volume, and wherein the converted state includes the captured changes to the changed portions of the data volume.

4. The system of claim 1, wherein the data store in the provider network is a block-based storage service and wherein the system further comprises one or more other computing nodes, respectively comprising at least one processor and a memory, to implement a virtual computing service, wherein at least one of the one or more other computing nodes is a host in the virtual computing service, and wherein the virtual computing service is configured to:
provision a virtual compute instance at the host that implements the virtual machine according to the converted state of the data volume for the virtual machine stored in the block-based storage service.

5. A method, comprising:
    detecting, by one or more computing devices operating in a destination network, a replication event to replicate a state of a data volume for a computing resource hosted at a computing device operating in a separate source network separate from the destination network;
    after detecting the replication event:
        sending, by the one or more computing devices operating in the destination network, a request to a replication agent hosted in the separate source network to send a copy of at least some data of the data volume for the computing resource hosted at the computing device operating in the separate source network to the destination network;
        receiving the copy of the at least some data of the data volume for the computing resource;
        based, at least in part, on the received copy of the at least some data of the data volume for the computing resource, generating, by the one or more computing devices operating in a destination network, the state of the data volume for the computing resource in a format operable to run the computing resource at a different computing device in the destination network; and
        storing, by the one or more computing devices operating in a destination network, the generated state of the data volume for the computing resource in a data store in the destination network.

6. The method of claim 5,
    wherein the replication event detects an event to capture changes to the data volume that occurred after a prior state of the data volume;
    wherein the request sent to the replication agent indicates a type of the replication task that causes the replication agent to:
        evaluate a description of changes to the data volume in order to identify the changes to the data volume that occurred after the prior state of the data volume;
        copy those portions of the data volume that include the identified changes to the data volume that occurred after the prior state of the data volume to the data store in the destination network; and
    wherein the generated state of the data volume includes the capture changes to the data volume.

7. The method of claim 5, wherein the replication event detects an event to capture an entirety of the data volume, wherein the request sent to the replication agent indicates a type of the replication task that instructs the replication agent to copy the data of the data volume.

8. The method of claim 5, further comprising:
    before detecting the replication event, receiving a request to register the replication agent as available to perform a replication task for the computing resource.

9. The method of claim 5, further comprising:
    before detecting the replication event:
        receiving, at the one or more computing devices, a request to create a replication job to replicate the data volume of the computing resource; and
        generating, by the one or more computing devices, replication state for the replication job to schedule one or more replications of the data volume as part of enabling replication for the data volume in response to the request to create the replication job.

10. The method of claim 9, wherein the replication event detects one of the scheduled replications of the data volume according to the replication state for the computing resource.

11. The method of claim 9, wherein the replication event is detected in response to receiving a request to perform an un-scheduled replication of the data volume in addition to the one or more scheduled replications of the data volume.

12. The method of claim 9, further comprising:
    sending, by the one or more computing devices, a request to the replication agent that instructions replication agent to delete the generated state of the data volume in the data store.

13. The method of claim 5, further comprising:
    detecting, by the one or more computing devices operating in a destination network, another replication event to replicate a state of another data volume for another computing resource hosted at another computing device operating in the source network;
    after detecting the other replication event:
        sending, by the one or more computing devices, a request to the replication agent to send a copy of at least some data of the other data volume to the destination network;
        based, at least in part, on the copy of the at least some data of the other data volume, generating, by the one or more computing devices, the state of the other data volume in a format operable to run the other computing resource at another different computing device in the destination network; and
        storing, by the one or more computing devices, the generated state of the other data volume in the data store in the destination network.

14. A non-transitory, computer-readable storage medium, storing program instructions that when executed by one or more computing devices cause the one or more computing devices to implement a migration service in a provider network that implements:
    evaluating a replication state for a computing resource hosted at a computing device operating in a separate source network separate from the provider network to detect a replication event to replicate a state of a data volume for the computing resource hosted at the computing device operating in the separate source network;
    after detecting the replication event:
        obtaining a copy of at least some data of the data volume for the computing resource hosted at the computing device operating in the separate source network from a replication agent hosted in the separate source network;
        based, at least in part, on the copy of the at least some data of the data volume for the computing resource obtained from the replication agent, generating the state of the data volume for the computing resource in a format operable to host the computing resource at a different computing device in the destination network; and
        storing the generated state of the data volume for the computing resource in a data store in the destination network.

15. The non-transitory, computer-readable storage medium of claim 14, wherein the program instructions further cause the migration service to implement:
    before detecting the replication event:
        receiving a request to create a replication job to replicate the data volume of the computing resource; and
        generating the replication state for the replication job to schedule one or more replications of the data volume as part of enabling replication for the data volume in response to the request to create the replication job.

16. The non-transitory, computer-readable storage medium of claim 15, wherein the replication event detects one of the scheduled replications of the data volume according to the replication state for the computing resource.

17. The non-transitory, computer-readable storage medium of claim 14,
wherein the replication event comprises an event to capture an entirety of the data volume; and
wherein in obtaining the copy of at least some data of the data volume from the replication agent, the program instructions cause the migration service to implement sending a request to perform a type of replication task that instructs the replication agent to copy the data of the data volume.

18. The non-transitory, computer-readable storage medium of claim 17, wherein the program instructions cause the one or more computing devices to further
evaluating the replication state for the computing resource hosted at the computing device operating in the separate source network to detect another replication event to replicate another state of the data volume for the computing resource hosted at the computing device operating in the separate source network, wherein the other replication event comprises an event to capture changes to changed portions of the data volume for the computing resource that occurred after the state of the data volume;
after detecting the other replication event:
sending a request to the replication agent to perform a type of replication task that instructs the replication agent to copy the changed portions of the data volume for the computing resource that occurred after the state of the data volume;
based, at least in part, on the changed portions of the data volume for the computing resource, generating the other state of the data volume for the computing resource in a format operable to host the computing resource at the different computing device in the destination network; and
storing the generated other state of the data volume for the computing resource in a data store in the destination network.

19. The non-transitory, computer-readable storage medium of claim 14, wherein, in generating the state of the data volume in the format operable to host the computing resource at the different computing device, the program instructions cause the migration service to implement changing a version of at least one of an operating system or an application included in the data volume.

20. The non-transitory, computer-readable storage medium of claim 14, wherein, in evaluating the replication state for the computing resource hosted at the computing device operating in the source network to detect the replication event, the program instructions cause the migration service to implement accessing state information store for a replication job for the data volume to detect a transition to a replication job lifecycle state.

* * * * *